(12) United States Patent
Shogaki

(10) Patent No.: US 9,754,198 B2
(45) Date of Patent: Sep. 5, 2017

(54) PRINTING APPARATUS TO AUTOMATICALLY SELECT SHEET SUPPLY SOURCE, CONTROL METHOD FOR PRINTING APPARATUS, AND STORAGE MEDIUM

(71) Applicant: CANON KABUSHIKI KAISHA, Tokyo (JP)

(72) Inventor: Yohei Shogaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/163,528

(22) Filed: May 24, 2016

(65) Prior Publication Data

US 2016/0350635 A1    Dec. 1, 2016

(30) Foreign Application Priority Data

May 29, 2015 (JP) ................. 2015-110205

(51) Int. Cl.
*G06K 15/00* (2006.01)
*G03G 15/00* (2006.01)
*G06K 15/02* (2006.01)

(52) U.S. Cl.
CPC ........ *G06K 15/4025* (2013.01); *G03G 15/50* (2013.01); *G06K 15/005* (2013.01); *G06K 15/1809* (2013.01); *G06K 15/4065* (2013.01)

(58) Field of Classification Search
None
See application file for complete search history.

(56) References Cited

U.S. PATENT DOCUMENTS

| 2014/0140749 A1* | 5/2014 | Harano | B41J 11/485 400/582 |
| 2015/0029549 A1* | 1/2015 | Murata | G06K 15/4065 358/1.15 |

FOREIGN PATENT DOCUMENTS

JP    2005-070128 A    3/2005

* cited by examiner

*Primary Examiner* — Andrew H Lam
(74) *Attorney, Agent, or Firm* — Canon U.S.A., Inc. IP Division

(57) ABSTRACT

A printing apparatus includes a reading unit to read a document image to generate image data, and a printing unit to print an image of the image data on a sheet supplied from any of multiple sheet storage portions. The printing apparatus determines whether an automatic selection function is enabled or disabled. The automatic selection function automatically selects, from among the sheet storage portions, a source for supplying a sheet that is used for printing. If the automatic selection function is enabled and a user specifies a predetermined sheet storage portion that has no sheet stored therein, the job execution instruction is not allowed. If the automatic selection function is disabled and a sheet storage portion that supplies a sheet for printing from among the plurality of sheet storage portions has no sheet stored therein, the job execution instruction is allowed.

16 Claims, 7 Drawing Sheets

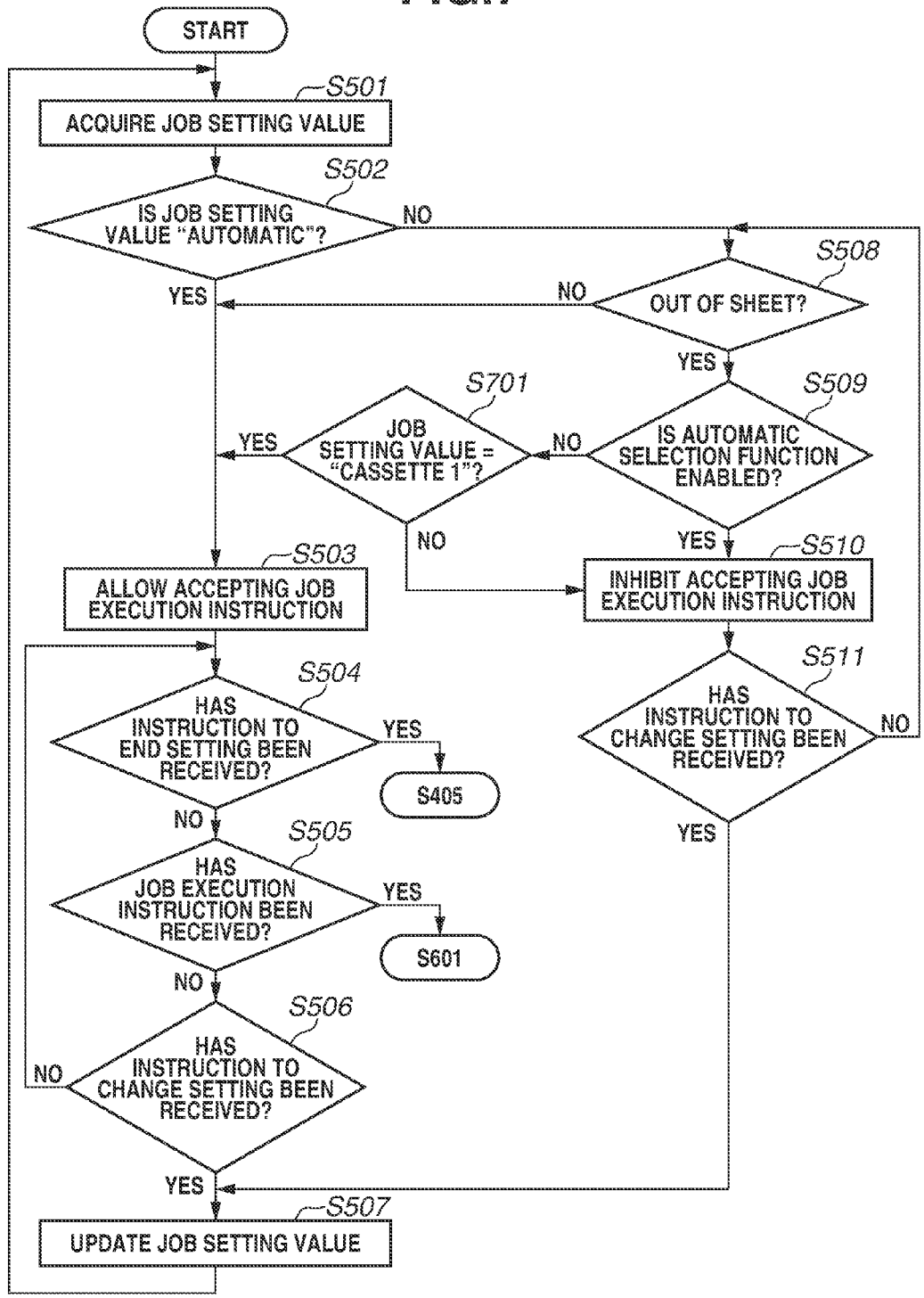

PRINTING APPARATUS TO AUTOMATICALLY SELECT SHEET SUPPLY SOURCE, CONTROL METHOD FOR PRINTING APPARATUS, AND STORAGE MEDIUM

BACKGROUND OF THE INVENTION

Field of the Invention

Aspects of the present invention generally relate to a printing apparatus that includes a plurality of sheet storage portions and that performs image reading with a reading unit and image printing with a printing unit in response to accepting an instruction to execute a job.

Description of the Related Art

In conventional printing apparatuses equipped with a plurality of cassettes, each of which stores sheets, an automatic selection function is known that stores information indicating the size of a sheet stored in each cassette and automatically selects, based on the stored information, a cassette that is used as a source for supplying sheets (a sheet supply source), as discussed in Japanese Patent Application Laid-Open No. 2005-070128. Using the automatic selection function enables automatically selecting, based on the size of a document (an original), for example, detected by a sensor, a cassette in which sheets with the same size as that of the document are stored, thus saving the user the trouble of having to manually select a cassette in which sheets with an appropriate size are stored. Furthermore, even if a certain cassette has no sheet stored therein (is in an out-of-sheet state), since, in a case where sheets with the same size as that of sheets stored in the certain cassette are stored in another cassette, such another cassette is automatically selected, the user can execute a job while postponing replenishing the certain cassette with sheets.

On the other hand, in the above-mentioned printing apparatuses, the user is allowed to specify, while avoiding the use of the automatic selection function, a particular cassette as a sheet supply source. For example, if the automatic selection function is used in a condition in which sheets with the same size but different in grammage, surface property, or price are respectively stored in a plurality of sheet storage portions, printing may be performed on a sheet different from a sheet that the user intends to use. In such a case, the user specifying a particular cassette and then issuing an instruction to execute a job (a job execution instruction) can make it possible for printing to be performed on a sheet stored in the particular cassette (i.e., a sheet that the user intends to use).

Furthermore, the above-mentioned printing apparatuses are configured such that, in a case where a particular cassette is specified as a sheet supply source, if the particular cassette is in the out-of-sheet state, a job execution instruction is not allowed to be accepted. The reason for this configuration is that, even if the job execution instruction is accepted, printing using the specified cassette cannot be started unless the specified cassette is replenished with sheets. Moreover, in that configuration, although the user is allowed to change the sheet supply source to another cassette by the user's decision prior to acceptance of the job execution instruction, the user is not allowed to make such a change by the user's decision after acceptance of the job execution instruction.

It is also known that, in a case where the above-mentioned automatic selection function is enabled (available), a state in which the use of the automatic selection function is specified is set as a default state. This setting results in the use of the automatic selection function even if the user issues a job execution instruction while omitting a part of the operation for setting a sheet supply source (for example, without displaying a screen for setting the sheet supply source). Accordingly, such a setting is convenient even for users unaccustomed to the operation.

On the other hand, in a case where the automatic selection function is not enabled (is unavailable), the state in which the use of the automatic selection function is specified cannot be set as a default state. In this case, it can be conceived that a state in which any one of a plurality of cassettes (for example, a cassette the conveyance path from which to a printing unit is shortest) is specified is set as a default state. According to this setting, in a case where the user issues a job execution instruction while omitting at least a part of the operation for setting a sheet supply source, if the cassette specified at the time of the default state has a sheet or sheets stored therein, printing can be performed. However, if the cassette specified at the time of the default state is in the out-of-sheet state, since such a condition is deemed to be a condition in which the cassette specified by the user's decision is in the out-of-sheet state, the job execution instruction cannot be accepted.

When the automatic selection function is enabled, if a particular cassette is specified as the sheet supply source, it is considered to be relatively highly possible that there exists the user's intention to use, for printing, sheets stored in the particular cassette. Accordingly, such a configuration is preferable as not to accept a job execution instruction if the specified cassette is in the out-of-sheet state. However, when the automatic selection function is not enabled, it is considered to be relatively highly possible that there exists no such user's intention and the user intends to execute the job while merely maintaining the default state. Nevertheless, such a configuration is not convenient as not to accept a job execution instruction, for the reason that the specified cassette is in the out-of-sheet state, despite the fact that sheets with the same size as that of sheets stored in the specified cassette are stored in another cassette.

SUMMARY OF THE INVENTION

According to an aspect of the present invention, a printing apparatus includes a plurality of sheet storage portions, a reading unit configured to read an image on a document to generate image data corresponding to the read image, an acquisition unit configured to acquire information about the document the image on which is read by the reading unit, a printing unit configured to print an image on a sheet supplied from any one of the plurality of sheet storage portions based on the image data generated by the reading unit, a control unit configured to cause, in response to accepting a job execution instruction, which is an instruction to execute a job, the reading unit to perform image reading and the printing unit to perform image printing, an automatic selection unit configured to automatically select, from among the plurality of sheet storage portions, a sheet supply source, which is a source for supplying a sheet that is used for printing, based on the information acquired by the acquisition unit, and a determination unit configured to determine whether the automatic selection unit is enabled or disabled, wherein, in a case where it is determined by the determination unit that the automatic selection unit is enabled, if a user specifies a predetermined sheet storage portion as a sheet storage portion that supplies a sheet for printing from among the plurality of sheet storage portions and the specified sheet storage portion has no sheet stored therein, the control unit does not allow the job execution instruction, and wherein, in a case where it is determined by the determination unit that the automatic selection unit is disabled, if a sheet storage portion that supplies a sheet for printing from among the plurality of sheet storage portions has no sheet stored therein, the control unit allows the job execution instruction.

Further features of the present invention will become apparent from the following description of exemplary embodiments with reference to the attached drawings.

BRIEF DESCRIPTION OF THE DRAWINGS

FIG. 7 is a flowchart illustrating an operation of a printing apparatus according to a second exemplary embodiment.

DESCRIPTION OF THE EMBODIMENTS

Various exemplary embodiments, features, and aspects of the invention will be described in detail below with reference to the drawings. Furthermore, the following exemplary embodiments should not be construed to limit the invention set forth in each claim, and not all of the combinations of features described in the exemplary embodiments are necessarily essential.

Figure 1:
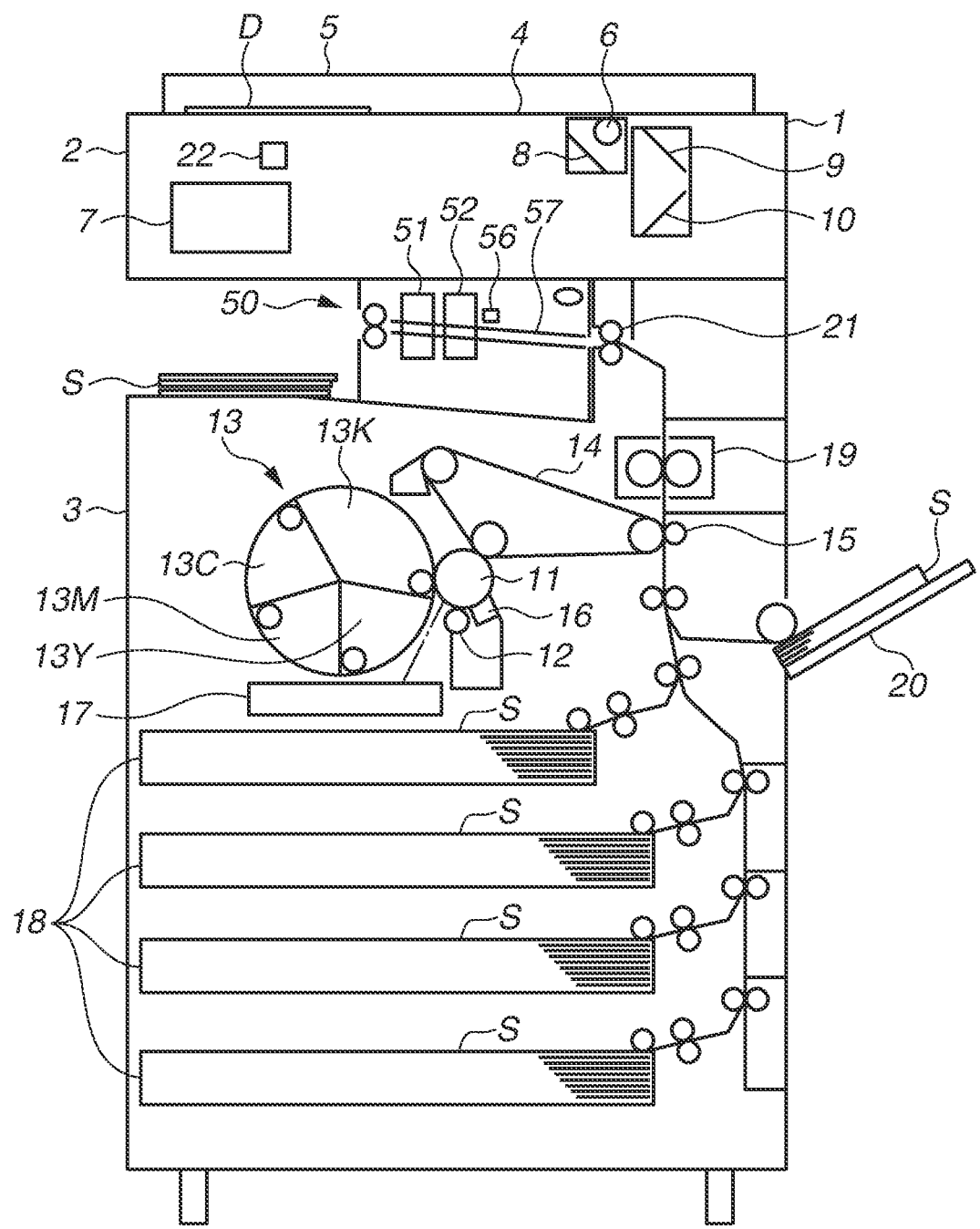
FIG. 1 is a sectional view illustrating a printing apparatus according to a first exemplary embodiment.

FIG. 1 is a sectional view illustrating the entirety of a printing apparatus 1 according to a first exemplary embodiment of the present invention. The printing apparatus 1, which can be roughly divided into two units, includes a scanner 2 (a reading unit), which reads an image on a document to generate image data, and a printer 3 (a printing unit), which prints an image on a sheet (for example, plain paper, thick paper, or transparent film). The scanner 2 includes, at an upper portion thereof, a document positioning plate 4, which includes a transparent glass plate. The document positioning plate 4 allows a document D to be set at a predetermined position thereof with an image of the document D, which is to be read, face-down, and the document D is pressed and fixed by a document pressure plate 5. The scanner 2 further includes, below the document positioning plate 4, a lamp 6, which illuminates the document D with light, and optical system members, which include reflecting mirrors 8, 9, and 10, which lead reflected light to an image processing unit 7. The document D is scanned by the lamp 6 and the reflecting mirrors 8, 9, and 10 moving at a predetermined speed.

The scanner 2 further includes a sensor 22 (an acquisition unit) which detects the size of the document D. The size of the document D detected by the sensor 22 is used for an automatic selection function for cassettes, which is described later below. Furthermore, although, in the present exemplary embodiment, the printing apparatus 1 illustrated in FIG. 1 is equipped with the sensor 22, a printing apparatus model equipped with no sensor 22 is also prepared for the purpose of reducing the price of the printing apparatus 1. A printing apparatus model equipped with the sensor 22 and a printing apparatus model equipped with no sensor 22 are loaded with a common control program at least with respect to operations described in the flowcharts, which are described later below. The printing apparatus model equipped with the sensor 22 has the automatic selection function set to be enabled, and the printing apparatus model equipped with no sensor 22 has the automatic selection function set to be disabled.

The printer 3 includes a photosensitive drum 11, a primary charging roller 12, a rotary developing unit 13, an intermediate transfer belt 14, a transfer roller 15, a cleaner 16, and other members. The surface of the photosensitive drum 11 allows an electrostatic latent image to be formed thereon with laser light radiated from a laser unit 17 based on image data generated by reading an image on the document D. The primary charging roller 12 uniformly charges the surface of the photosensitive drum 11 before the photosensitive drum 11 is irradiated with the laser light.

The rotary developing unit 13 causes toners of respective colors, i.e., magenta (M), cyan (C), yellow (Y), and black (K), to adhere to the electrostatic latent image formed on the surface of the photosensitive drum 11, thus forming a toner image. The toner image developed on the surface of photosensitive drum 11 is transferred to the intermediate transfer belt 14, and the toner image on the intermediate transfer belt 14 is then transferred by the transfer roller 15 to a sheet S. The cleaner 16 removes toner remaining on the photosensitive drum 11 after transfer of the toner image.

The rotary developing unit 13, which uses a rotary developing method, includes a developing device 13K, a developing device 13Y, a developing device 13M, and a developing device 13C, and is rotatable by a motor (not illustrated). When a monochrome toner image is formed on the photosensitive drum 11, the developing device 13K is rotated and moved to a developing position proximate to the photosensitive drum 11, thus performing developing. When a full-color toner image is formed on the photosensitive drum 11, the rotary developing unit 13 is rotated to place each developing device to a developing position, thus performing developing in order for respective colors.

The sheet S, to which the toner image on the intermediate transfer belt 14 is transferred, is supplied to a transfer position from any one of cassettes 18 or a manual feed tray 20. A fixing device 19, which fixes the toner image on the conveyed sheet S, is mounted on the downstream side of the transfer roller 15 in the conveyance direction. The sheet S having the toner image fixed thereto is discharged by a discharge roller pair 21 from the printing apparatus 1 to a sheet processing device 50 on the downstream side in the conveyance direction.

The cassettes 18 serve as sheet storage portions, which store sheets. In the present exemplary embodiment, the cassettes 18 include four cassettes, which are able to store sheets with the same size or with respective different sizes. Each of the cassettes 18 is equipped with a sensor, which is used to detect the size of stored sheets based on the position of a guide, and a sensor, which is used to detect the remaining amount of sheets (whether each cassette has no sheet stored therein (is in an out-of-sheet state)).

The sheet processing device 50 is connected to the sheet discharge position of the printing apparatus 1 and is configured to be able to communicate with the printing apparatus 1 via a signal line (not illustrated). The sheet processing device 50 performs communication with the printing apparatus 1 to operate in cooperation with the printing apparatus 1. The sheet processing device 50 includes a stapler 51, which staples a plurality of sheets with the use of staples, and a stapler 52, which staples a plurality of sheets without the use of staples, with respect to the sheet S discharged by the discharge roller pair 21.

The sheet processing device 50 further includes a sheet detection sensor 56, which detects the presence or absence of the sheet S, and a sheet alignment portion 57, which aligns the sheets S. The sheet processing device 50 detects, via the sheet detection sensor 56, the sheets S conveyed to the sheet alignment portion 57 and then performs stapling processing on the sheets S via the stapler 51 or the stapler 52.

Figure 2:
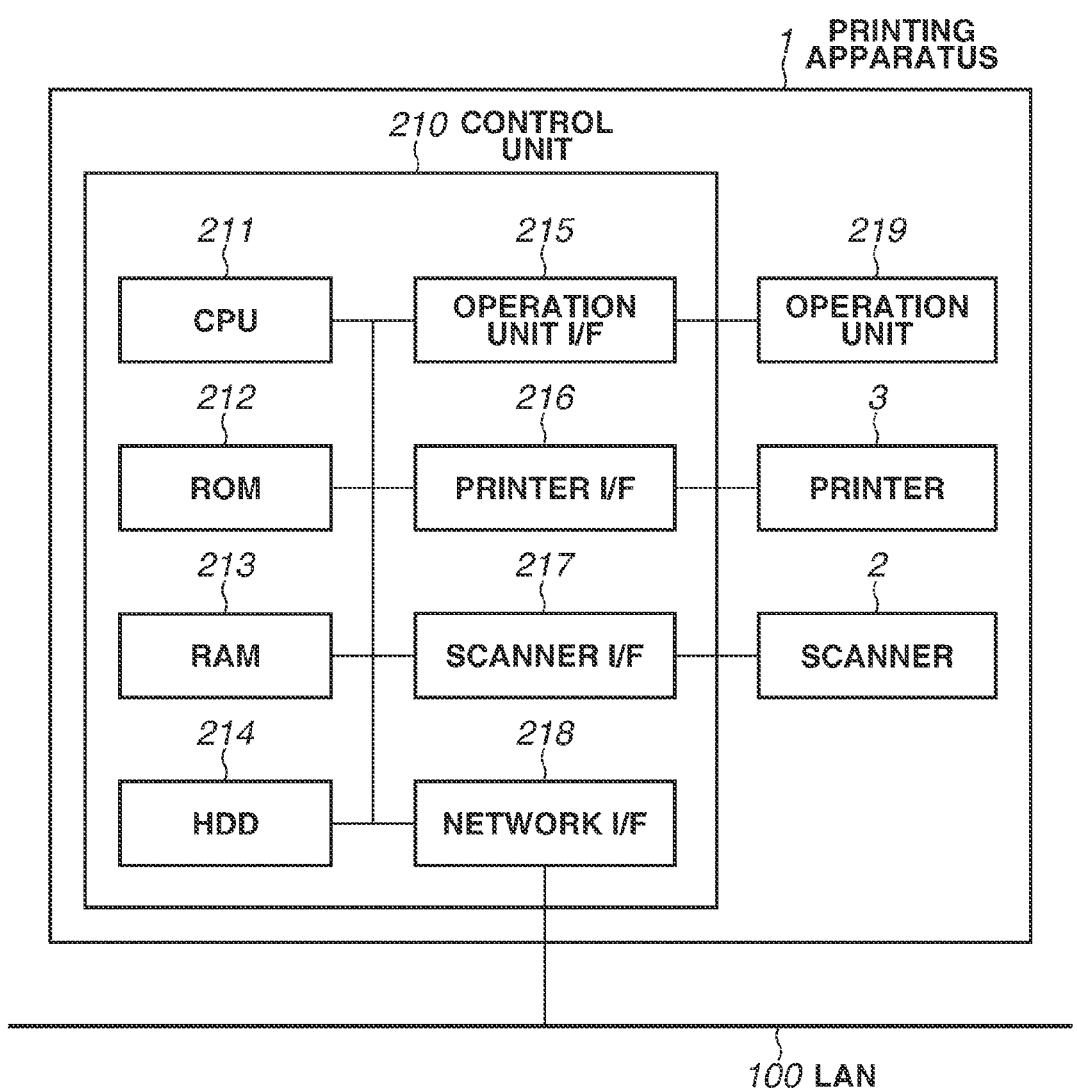
FIG. 2 is a hardware configuration diagram illustrating the printing apparatus according to the first exemplary embodiment.

FIG. 2 is a block diagram illustrating a configuration of the printing apparatus 1. A control unit 210, which includes a central processing unit (CPU) 211, controls an operation of the entire printing apparatus 1. The CPU 211 reads out a control program stored in a read-only memory (ROM) 212 to perform various control operations, such as reading control and printing control. A random access memory (RAM) 213 is used as a temporary storage region, such as a main memory or work area, for the CPU 211. Furthermore, although the printing apparatus 1 is configured such that a single CPU 211 uses a single memory (the RAM 213 or a hard disk drive (HDD) 214) to perform processing operations indicated in the flowcharts described later below, another configuration can be employed. For example, a plurality of CPUs and a plurality of RAMS, HDDs, or solid state drives (SSDs) can cooperate to perform respective processing operations. Moreover, a part of the processing operations described later below can be performed by a hardware circuitry, such as application specific integrated circuits (ASIC).

The HDD 214 stores image data and various programs. An operation unit interface (I/F) 215 connects the control unit 210 to an operation unit 219. The operation unit 219, which is provided with a liquid crystal portion having a touch panel function, a keyboard, and other members, functions as a reception unit that receives an instruction from the user.

A printer I/F 216 connects the control unit 210 to the printer 3. Image data to be printed by the printer 3 is transferred from the control unit 210 to the printer 3 via the printer I/F 216, and is then printed on a recording medium by the printer 3.

A scanner I/F 217 connects the control unit 210 to the scanner 2. The scanner 2 reads an image on a document to generate image data corresponding to the read image, and then inputs the image data to the control unit 210 via the scanner I/F 217. The printing apparatus 1 is able to print the image data generated by the scanner 2 using the printer 3.

A network I/F 218 connects the control unit 210 (the printing apparatus 1) to a local area network (LAN) 100. The network I/F 218 transmits image data or information to an external device on the LAN 100 and receives various pieces of information from an external device on the LAN 100.

Figure 3A:
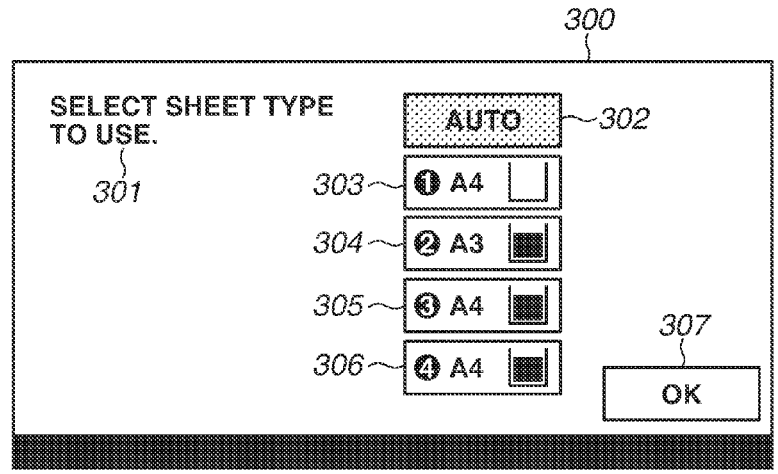
FIGS. 3A, 3B, and 3C illustrate examples of operation screens that are displayed on the printing apparatus according to the first exemplary embodiment.
Figure 3B:
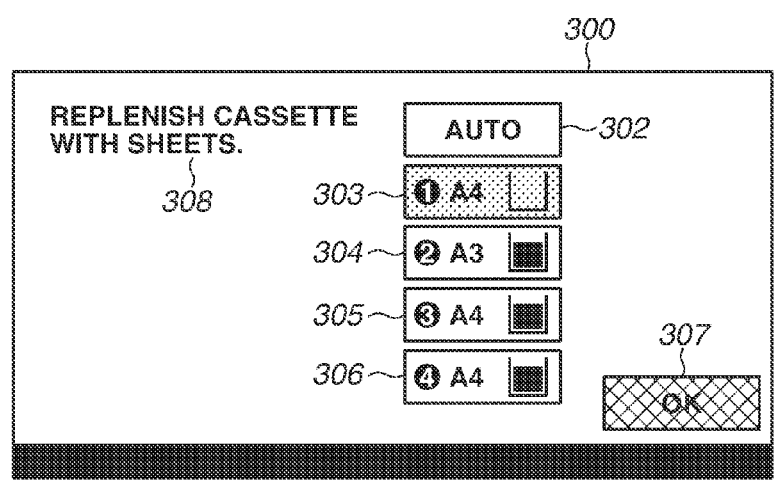
Figure 3C:
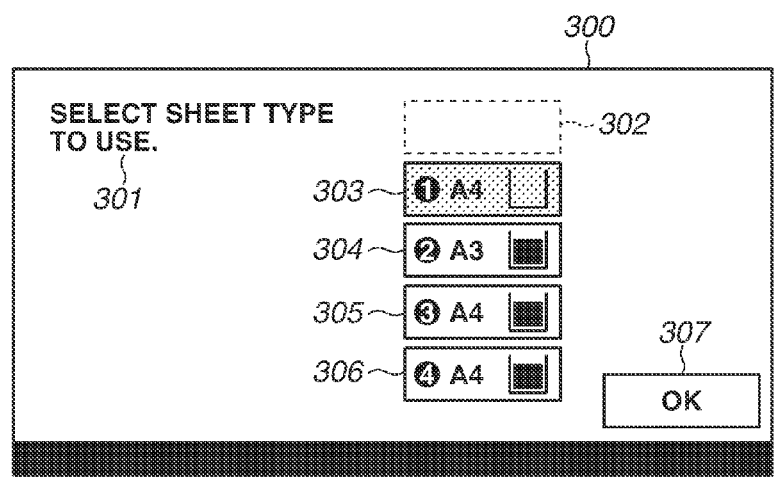

FIGS. 3A, 3B, and 3C illustrate examples of operation screens that are displayed on the liquid crystal portion of the operation unit 219. In particular, each of FIGS. 3A to 3C illustrates a setting screen 300 used to perform setting regarding a source for supplying sheets (a sheet supply source). The setting screen 300 illustrated in FIG. 3A is a screen that is displayed in a printing apparatus model equipped with the sensor 22. A message 301 is displayed to prompt the user to select a sheet type. An operation key 302 can be pressed to specify automatically selecting a cassette to use as the sheet supply source (using the automatic selection function).

The automatic selection function is a function to automatically select a cassette to use as the sheet supply source based on the size of a document detected by the sensor 22 and information indicating the sizes of sheets stored in association with the respective cassettes. The information indicating the sizes of sheets associated with the respective cassettes is stored in the HDD 214. Associating the respective cassettes with the sheet sizes is performed based on a result of detection provided by a size detection sensor mounted in each cassette, but may be performed based on a size selection operation performed by the user via a screen (not illustrated). Since the printing apparatus model equipped with the sensor 22 has the automatic selection function set to be enabled (available), the operation key 302 is displayed.

In a case where the automatic selection function is enabled, the state in which the automatic selection function has been specified (the state in which the operation key 302 has been pressed) is set as a default state. When an OK button 307 is pressed with the operation key 302 pressed, using the automatic selection function is confirmed and set. Furthermore, when a start button (not illustrated) for accepting the job execution instruction is pressed instead of the OK button 307, using the automatic selection function is also confirmed and set. Moreover, when the start button is pressed without the setting screen 300 being displayed, the automatic selection function is also set to be used.

Operation keys 303 to 306 respectively correspond to the four cassettes 18 included in the printing apparatus 1. The operation key 303 corresponds to the cassette 18 located uppermost, in association with which the size information indicating "A4" is stored. Additionally, a state in which this cassette is currently in the out-of-sheet state is indicated by a displayed icon. The operation key 304 corresponds to the cassette 18 located at the second from the top, in association with which the size information indicating "A3" is stored. Additionally, a state in which this cassette is not currently in the out-of-sheet state is indicated by a displayed icon.

The operation key 305 corresponds to the cassette 18 located at the third from the top, in association with which the size information indicating "A4" is stored. Additionally, a state in which this cassette is not currently in the out-of-sheet state is indicated by a displayed icon. The operation key 306 corresponds to the cassette 18 located at the fourth from the top, in association with which the size information indicating "A4" is stored. Additionally, a state in which this cassette is not currently in the out-of-sheet state is indicated by a displayed icon.

The setting screen 300 illustrated in FIG. 3B is a screen that is displayed when the user has pressed the operation key 303 on the setting screen 300 illustrated in FIG. 3A. This screen indicates a state in which the operation key 303 has been pressed instead of the operation key 302, thus representing that the cassette 18 located uppermost has been specified as the sheet supply source. Here, since the specified cassette is currently in the out-of-sheet state, the OK button 307 is grayed out and is thus currently unable to be pressed. Additionally, in this instance, the above-mentioned start button is also currently unable to be pressed. In other words, accepting the job execution instruction is inhibited. A message 308 is displayed to prompt the user to replenish the cassette 18 with sheets. Furthermore, when the user next presses the operation key 304 on the setting screen 300 that is in the state illustrated in FIG. 3B, since the cassette 18 located at the second from the top is not currently in the out-of-sheet state, the OK button 307 and the start button become able to be pressed. In other words, accepting the job execution instruction becomes allowed.

The setting screen 300 illustrated in FIG. 3C is a screen that is displayed in a printing apparatus model equipped with no sensor 22. The automatic selection function, as mentioned above, is a function to automatically select a cassette to use as the sheet supply source based on the size of a document detected by the sensor 22 and information indicating the sizes of sheets stored in association with the respective cassettes. Accordingly, since the printing apparatus model equipped with no sensor 22 has the automatic selection function set to be disabled (unavailable), the operation key 302 is not displayed.

Furthermore, even the printing apparatus model equipped with the sensor 22 can be allowed to set the automatic selection function to be disabled. For example, in a case where, while the sensor 22 is provided, the sensor 22 is out of order, or the automatic selection function is turned off by a switch, the automatic selection function can be set to be disabled.

In a case where the automatic selection function is disabled, a state in which the cassette 18 located uppermost has been specified (a state in which the operation key 303 has been pressed) is set as a default state. Compared to the screen illustrated in FIG. 3B, while the screen illustrated in FIG. 3B indicates that the OK button 307 is grayed out and is thus unable to be pressed, the screen illustrated in FIG. 3C indicates that the OK button 307 is able to be pressed without being grayed out. In this instance, the above-mentioned start button is also able to be pressed, so that accepting the job execution instruction is allowed.

When the automatic selection function is enabled, if a particular cassette is specified as the sheet supply source, it is considered to be relatively highly possible that there exists the user's intention to use, for printing, sheets stored in the particular cassette. Accordingly, such a configuration is preferable as not to accept a job execution instruction if the specified cassette is in the out-of-sheet state. However, when the automatic selection function is not enabled, it is considered to be relatively highly possible that there exists no such user's intention and the user intends to execute the job while merely maintaining the default state. Nevertheless, such a configuration is not convenient as not to accept a job execution instruction, for the reason that the specified cassette is in the out-of-sheet state, despite the fact that sheets with the same size as that of sheets stored in the specified cassette are stored in another cassette. In the present exemplary embodiment, in view of this issue, even in a case where a particular cassette is specified and the particular cassette is currently in the out-of-sheet state, if the automatic selection function is disabled, accepting the job execution instruction is allowed.

Figure 4:
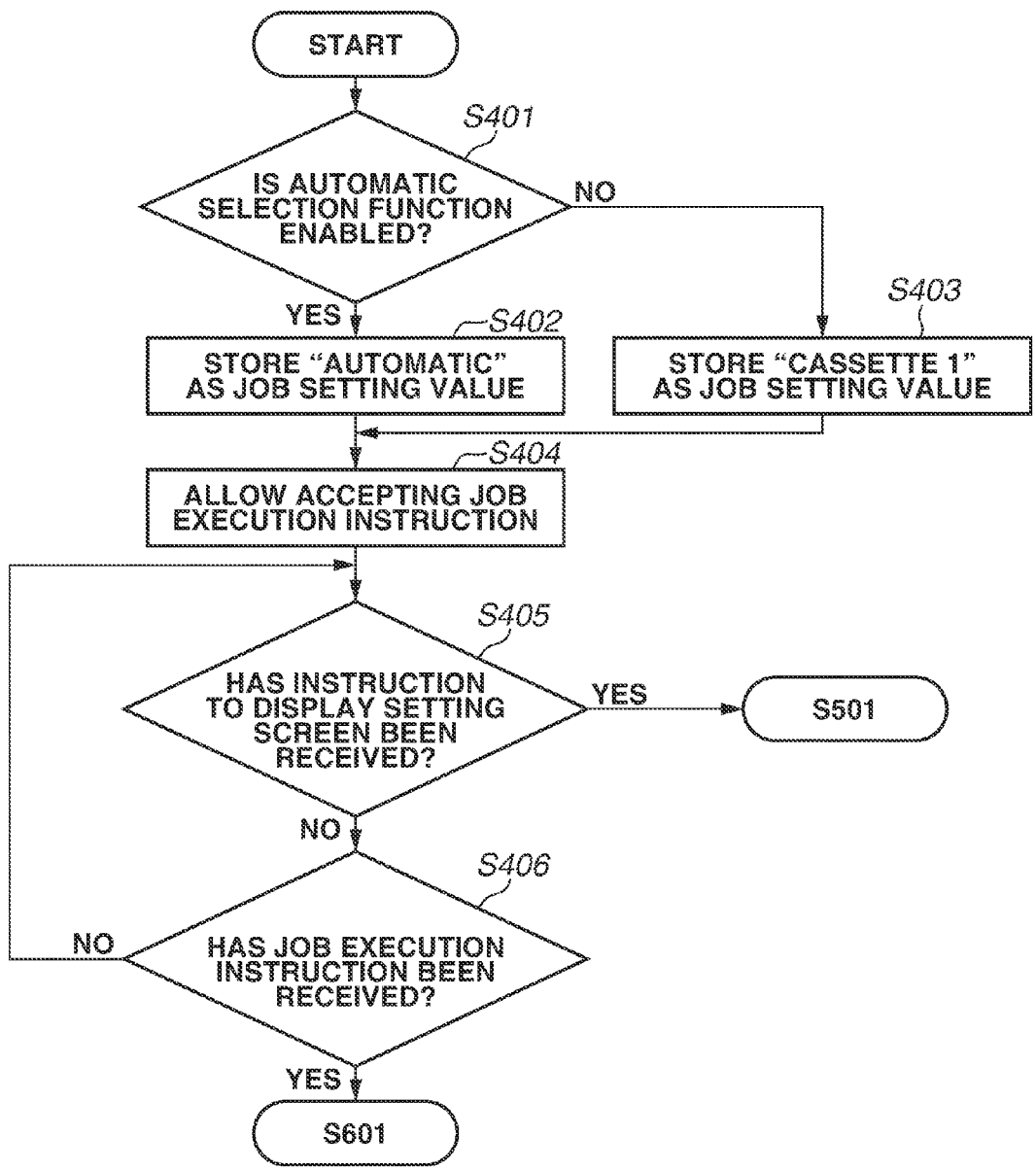
FIG. 4 is a flowchart illustrating an operation of the printing apparatus according to the first exemplary embodiment.

FIG. 4 is a flowchart illustrating an operation of the printing apparatus 1, which is started in response to a copy function being selected by the user in a menu screen displayed at the time of starting of the printing apparatus 1. Each operation (step) illustrated in the flowchart of FIG. 4 is implemented by the CPU 211 of the printing apparatus 1 executing the control program stored in the ROM 212.

In step S401, the CPU 211 determines whether the automatic selection function is enabled. Here, based on a model ID of the printing apparatus 1, the CPU 211 determines that the automatic selection function is enabled if the printing apparatus 1 is a model equipped with the sensor 22, and determines that the automatic selection function is disabled if the printing apparatus 1 is a model equipped with no sensor 22. Furthermore, instead of this method, the CPU 211 can perform such a determination by referring to information directly indicating the presence or absence of the sensor 22. Moreover, as mentioned above, the CPU 211 can perform such a determination based on whether the sensor 22 is out of order or whether the automatic selection function is turned on or off by a switch.

If, in step S401, it is determined that the automatic selection function is enabled (YES in step S401), the processing proceeds to step S402. In step S402, the CPU 211 stores, in the RAM 213, "automatic", which indicates that the automatic selection function is specified as a job setting value. On the other hand, if, in step S401, it is determined that the automatic selection function is not enabled (is disabled) (NO in step S401), the processing proceeds to step S403. In step S403, the CPU 211 stores, in the RAM 213, "cassette 1", which indicates that the cassette located uppermost is specified, as a job setting value. The reason why "cassette 1" is set as an initial value is that the conveyance path from the cassette located uppermost to a printing engine is the shortest. Furthermore, the processing so far can be performed when the printing apparatus 1 has been powered on.

In step S404, the CPU 211 allows accepting a job execution instruction. More specifically, the CPU 211 shifts a light-emitting diode (LED) lamp, which is mounted on the start button for accepting a job execution instruction, from a lighting-off state to a green lighting-on state and starts processing for detecting the press of the start button.

In step S405, the CPU 211 determines whether an instruction to display the setting screen 300 illustrated in FIG. 3A, 3B, or 3C has been received. If it is determined that an instruction to display the setting screen 300 has been received (YES in step S405), the processing proceeds to step S501 illustrated in FIG. 5. If it is determined that an instruction to display the setting screen 300 has not been received (NO in step S405), the processing proceeds to step S406. In step S406, the CPU 211 determines whether the job execution instruction has been accepted. Here, if the start button has been pressed, the CPU 211 determines that the job execution instruction has been accepted (YES in step S406), and the processing then proceeds to step S601 illustrated in FIG. 6. If the start button has not been pressed, the CPU 211 determines that the job execution instruction has not been accepted (NO in step S406), and the processing then returns to step S405.

Figure 5:
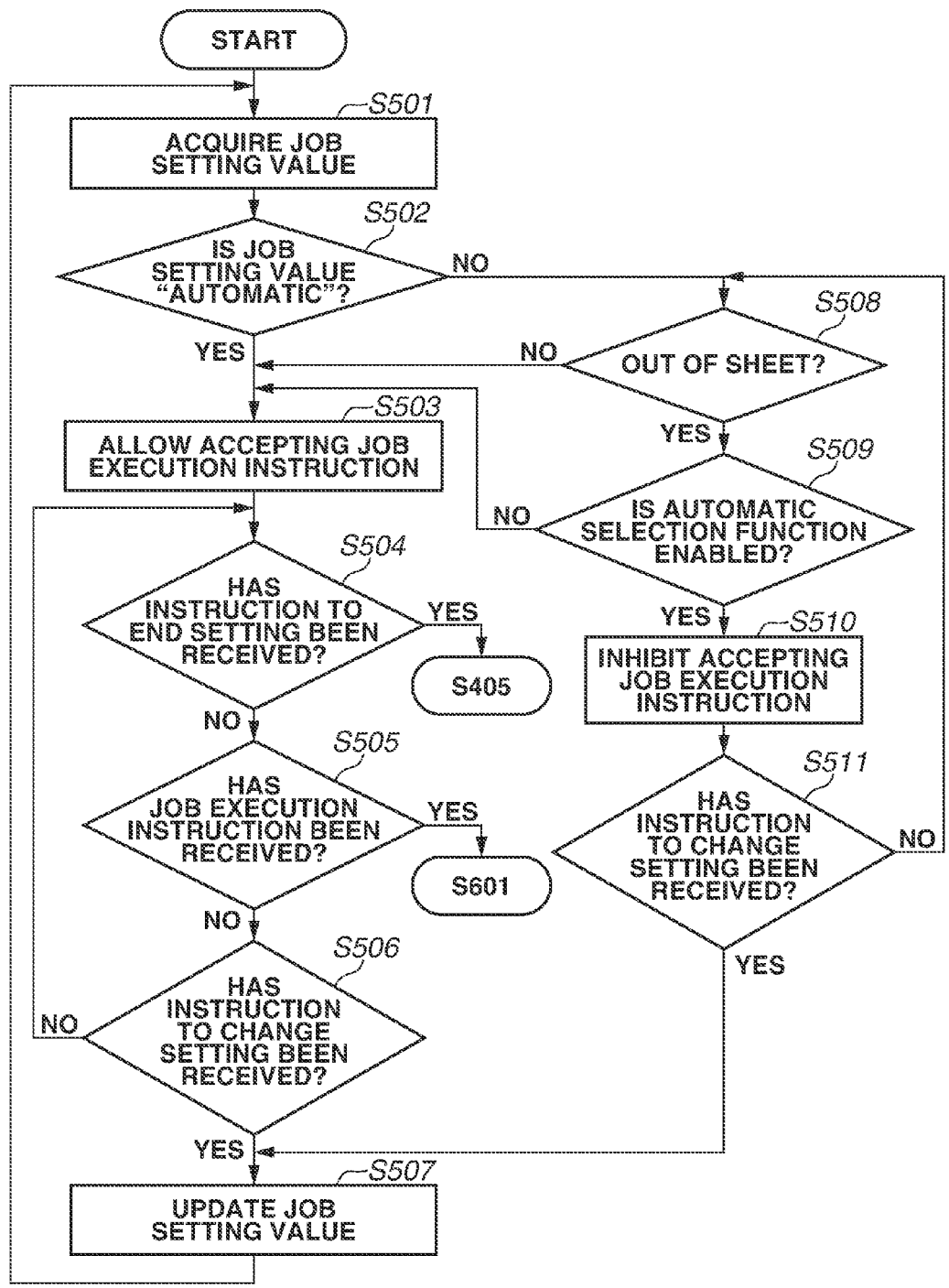
FIG. 5 is a flowchart illustrating an operation of the printing apparatus according to the first exemplary embodiment.

FIG. 5 is a flowchart illustrating an operation of the printing apparatus 1, which is started in response to receiving an instruction to display the setting screen 300. Each operation (step) illustrated in the flowchart of FIG. 5 is implemented by the CPU 211 of the printing apparatus 1 executing the control program stored in the ROM 212.

In step S501, the CPU 211 acquires the job setting value stored in the RAM 213. In step S502, the CPU 211 determines whether the job setting value acquired in step S501 is "automatic". If it is determined that the job setting value is "automatic" (YES in step S502), the processing proceeds to step S503. In step S503, the CPU 211 allows (does not inhibit) accepting a job execution instruction, as in step S404. Furthermore, if accepting a job execution instruction has already been allowed when the processing reaches step S503, the CPU 211 does nothing in step S503.

If, in step S502, it is determined that the job setting value is not "automatic" (NO in step S502), the processing proceeds to step S508. Furthermore, the job setting value not being "automatic" means that the job setting value is any one of "cassette 1", "cassette 2", "cassette 3", and "cassette 4". In step S508, the CPU 211 determines whether the cassette indicated by the job setting value (i.e., the cassette specified as the sheet supply source) is currently in the out-of-sheet state. If it is determined that the specified cassette is not in the out-of-sheet state (NO in step S508), the processing proceeds to step S503, in which the CPU 211 allows accepting the job execution instruction.

If, in step S508, it is determined that the cassette indicated by the job setting value is currently in the out-of-sheet state (YES in step S508), the processing proceeds to step S509. In step S509, the CPU 211 determines whether the automatic selection function is enabled. Here, the determination is performed in a similar way to that in step S401. If it is determined that the automatic selection function is enabled (YES in step S509), the processing proceeds to step S510. In step S510, the CPU 211 inhibits (does not allow) accepting the job execution instruction. More specifically, the CPU 211 shifts the LED lamp, which is mounted on the start button for receiving a job execution instruction, from a green lighting-on state to a lighting-off state and then stops processing for detecting the press of the start button. Furthermore, if accepting a job execution instruction has already been inhibited when the processing reaches step S510, the CPU 211 does nothing in step S510.

When the automatic selection function is enabled, if a particular cassette is specified as the sheet supply source, it is considered to be relatively highly possible that there exists the user's intention to use, for printing, sheets stored in the particular cassette. Accordingly, in a case where the result of determination in step S502 is NO, the result of determination in step S508 is YES, and the result of determination in step S509 is YES, the CPU 211 does not accept the job execution instruction.

On the other hand, if, in step S509, it is determined that the automatic selection function is not enabled (NO in step S509), the processing proceeds to step S503, in which the CPU 211 allows accepting the job execution instruction. When the automatic selection function is not enabled, even if a particular cassette is specified as the sheet supply source, it is considered to be relatively highly possible that there exists no user's intention to use the particular sheet for printing and the user intends to execute a job while merely maintaining the default state. Nevertheless, such a configuration is not convenient as not to accept the job execution instruction, for the reason that the cassette specified as the default state is in the out-of-sheet state, despite the fact that sheets with the same size as that of sheets stored in the specified cassette are stored in another cassette. Accordingly, even in a case where the result of determination in step S502 is NO and the result of determination in step S508 is YES, if the result of determination in step S509 is NO, the CPU 211 accepts the job execution instruction.

In step S504, the CPU 211 determines whether an instruction to end the setting has been received. Here, when the OK button 307 has been pressed, the CPU 211 determines that an instruction to end the setting has been received (YES in step S504), and the processing then returns to step S405 illustrated in FIG. 4. If it is determined that an instruction to end the setting has not been received (NO in step S504), the processing proceeds to step S505. In step S505, the CPU 211 determines whether a job execution instruction has been accepted. Here, when the start button has been pressed, the CPU 211 determines that a job execution instruction has been accepted (YES in step S505), and the processing then proceeds to step S601 illustrated in FIG. 6. When the start button has not been pressed, the CPU 211 determines that a job execution instruction has not been accepted (NO in step S505), and the processing then proceeds to step S506.

In step S506, the CPU 211 determines whether an instruction to change the setting has been received. Here, when an operation key different from the currently selected operation key among the operation keys 302 to 306 has been pressed, the CPU 211 determines that an instruction to change the setting has been received (YES in step S506), and the processing then proceeds to step S507. If it is determined that an instruction to change the setting has not been received (NO in step S506), the processing returns to step S504. In step S507, the CPU 211 updates the job setting value stored in the RAM 213 to a value corresponding to the pressed operation key, and the processing then returns to step S501. For example, when the operation key 306 is newly pressed with the operation key 302 pressed, the CPU 211 stores "cassette 4" as the job setting value.

In step S511, the CPU 211 determines whether an instruction to change the setting has been received, as in step S506. Here, when an operation key different from the currently selected operation key among the operation keys 302 to 306 has been pressed, the CPU 211 determines that an instruction to change the setting has been received (YES in step S511), and the processing then proceeds to step S507. If an instruction to change the setting has not been received (NO in step S511), the processing returns to step S508. In this instance, if the user, without changing the setting, replenishes the cassette indicated by the job setting value with sheets, the result of determination in step S508 becomes NO, so that, in step S503, the CPU 211 allows accepting the job execution instruction.

Figure 6:
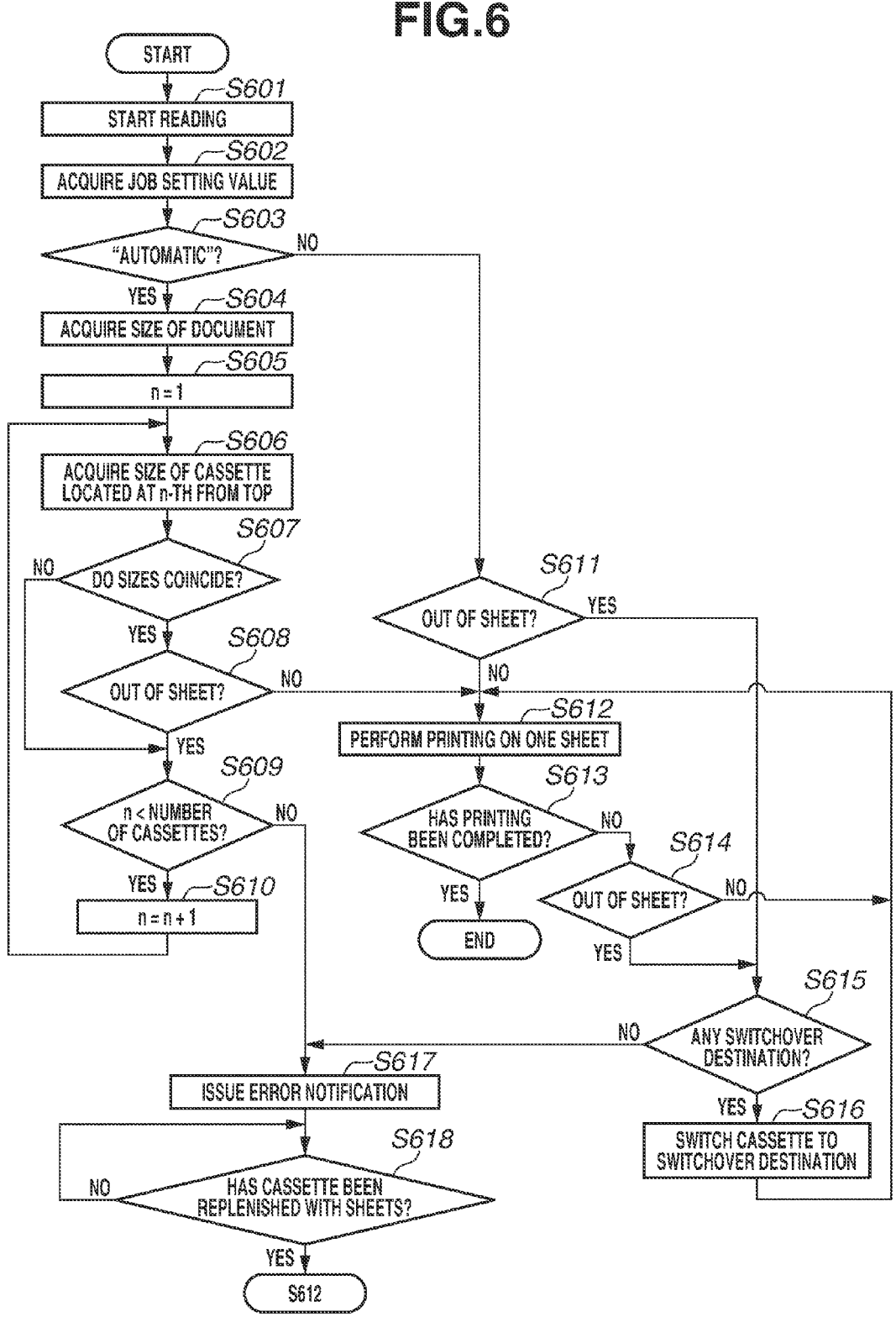
FIG. 6 is a flowchart illustrating an operation of the printing apparatus according to the first exemplary embodiment.

FIG. 6 is a flowchart illustrating an operation of the printing apparatus 1, which is started in response to accepting the job execution instruction. Each operation (step) illustrated in the flowchart of FIG. 6 is implemented by the CPU 211 of the printing apparatus 1 executing the control program stored in the ROM 212.

In step S601, the CPU 211 causes the scanner 2 to start reading an image on a document. Furthermore, reading of an image on a document by the scanner 2 is performed in asynchronization with and in parallel with processing performed in step S602 and subsequent steps. In other words, reading is sequentially advanced until reading of the document to read is completed regardless of the progress of processing in each of step S602 and subsequent steps, and the processing in step S602 and subsequent steps is performed in parallel with the execution of reading processing.

In step S602, the CPU 211 acquires the job setting value stored in the RAM 213. In step S603, the CPU 211 determines whether the job setting value acquired in step S602 is "automatic". If it is determined that the job setting value is "automatic" (YES in step S603), the processing proceeds to step S604. If it is determined that the job setting value is not "automatic" (NO in step S603), the processing proceeds to step S611.

In step S604, the CPU 211 acquires the size of a document detected by the sensor 22. In step S605, the CPU 211 sets the value of a variable n to "1". In step S606, the CPU 211 acquires, by referring to the information stored in the HDD 214, the size of a sheet indicated by the information stored in association with the cassette located at the n-th from the top. In step S607, the CPU 211 determines whether the size of the document acquired in step S604 and the size of the sheet acquired in step S606 coincide with each other. If it is determined that they coincide (YES in step S607), the processing proceeds to step S608. If it is determined that they do not coincide (NO in step S607), the processing proceeds to step S609.

Furthermore, in the present exemplary embodiment, sheets with the same size as that of the document are to be used for printing. However, in a case where the aggregate printing (N-up printing), in which a plurality of pages are printed on one side of a sheet, or the enlargement or reduction of an image is set, such a setting is taken into consideration in the determination in step S607. In step S608, the CPU 211 determines whether the cassette located at the n-th from the top is currently in the out-of-sheet state. If it is determined that the mentioned cassette is not currently in the out-of-sheet state (NO in step S608), the CPU 211 determines the cassette located at the n-th from the top as the sheet supply source, and then in step S612, starts printing. If it is determined that the mentioned cassette is currently in the out-of-sheet state (YES in step S608), the processing proceeds to step S609.

In step S609, the CPU 211 determines whether the value of n is less than the number of cassettes (in the present exemplary embodiment, four). If it is determined that the value of n is less than the number of cassettes (YES in step S609), the processing proceeds to step S610. In step S610, the CPU 211 adds "1" to the value of n, and the processing then returns to step S606. If it is determined that the value of n is not less than the number of cassettes (NO in step S609), the processing proceeds to step S617. In step S617, the CPU 211 issues an error notification. Then, if, in step S618, it is determined that the corresponding cassette has been replenished with sheets (YES in step S618), the processing proceeds to step S612. The above-described processing in step S604 to step S610 is called "auto paper selection (APS)".

On the other hand, in step S611, the CPU 211 determines whether the cassette indicated by the job setting value (the cassette specified as the sheet supply source before acceptance of the job execution instruction) is currently in the out-of-sheet state. If it is determined that the mentioned cassette is not currently in the out-of-sheet state (NO in step S611), the CPU 211 determines the mentioned cassette as the sheet supply source, and then in step S612, starts printing. If it is determined that the mentioned cassette is currently in the out-of-sheet state (YES in step S611), the processing proceeds to step S615.

In step S612, the CPU 211 prints an image on one sheet conveyed from the cassette determined as the sheet supply source. Then, in step S613, the CPU 211 determines whether printing has been completed. If it is determined that printing has been completed (YES in step S613), the processing ends. If it is determined that printing has not yet been completed (NO in step S613), the processing proceeds to step S614. In step S614, the CPU 211 determines whether the cassette that is being currently used has come into the out-of-sheet state. If it is determined that the mentioned cassette has come into the out-of-sheet state (YES in step S614), the processing proceeds to step S615. If it is determined that the mentioned cassette has not come into the out-of-sheet state (NO in step S614), the processing returns to S612, in which the CPU 211 performs printing on a next sheet.

In step S615 and step S616, the CPU 211 performs processing called "auto cassette change (ACC)". More specifically, in step S615, the CPU 211 determines whether there is a cassette serving as a switchover destination. This determination is performed based on the information indicating the sizes of sheets for respective cassettes stored in the HDD 214. In this instance, if there is another cassette in which sheets with the same size as that of sheets stored in the current sheet supply source are stored and which is not in the out-of-sheet state, the CPU 211 determines that there is a cassette serving as a switchover destination (YES in step S615), and the processing then proceeds to step S616. In step S616, the CPU 211 switches the sheet supply source to the cassette determined in step S615, and the processing then returns to step S612. If, in step S615, it is determined that there is no cassette serving as a switchover destination (NO in step S615), the processing proceeds to step S617.

While the above-described processing for APS is performed only in a case where the job setting value acquired in step S602 is "automatic", the above-described processing for ACC is performed regardless of whether the job setting value acquired in step S602 is "automatic". According to this configuration, even in a case where the user has definitely specified a cassette, when sheets in the cassette have run out, the cassette is switched to another cassette, thus enabling continuing printing.

In this way, in the present exemplary embodiment, the CPU 211 determines whether the automatic selection function, which automatically selects a cassette to use as a sheet supply source, is enabled. Then, if it is determined that the automatic selection function is enabled, in a case where any one of a plurality of cassettes is specified as the sheet supply source and the specified cassette has no sheet stored therein, the CPU 211 does not allow accepting a job execution instruction. On the other hand, if it is determined that the automatic selection function is not enabled, even in a case where any one of a plurality of cassettes is specified as the sheet supply source and the specified cassette has no sheet stored therein, the CPU 211 allows accepting a job execution instruction.

In other words, an operation performed in a case where the specified cassette has no sheet stored therein is made to differ depending on whether the automatic selection function for selecting a sheet supply source is enabled, so that user's convenience can be improved.

Next, a second exemplary embodiment of the present invention is described. In the above-described first exemplary embodiment, if, in step S509 illustrated in FIG. 5, it is determined that the automatic selection function is not enabled (NO in step S509), the processing proceeds to step S503 regardless of which cassette the job setting value indicates, and, in step S503, the CPU 211 allows accepting a job execution instruction. However, a case where the job setting value indicates other than "cassette 1" means that the "cassette 1", which is set as a default state, has been changed to another cassette by a specifying operation performed by the user via the setting screen 300 illustrated in FIG. 3C. In this case, since it is considered to be relatively highly possible that there exists the user's intention to use, for printing, sheets stored in the specified cassette, if the specified sheet is in the out-of-sheet state, it is preferable not to accept a job execution instruction. The second exemplary embodiment describes an example in which the flowchart of FIG. 5 is modified in view of the above issue. Furthermore, in the following description, only points different from those in the first exemplary embodiment are described, and the other points are deemed to be the same as those in the first exemplary embodiment.

FIG. 7 is a flowchart illustrating an operation of the printing apparatus 1, which is started in response to reception of an instruction to display the setting screen 300 and which corresponds to the flowchart of FIG. 5 described in the first exemplary embodiment. When the flowchart of FIG. 7 is compared with the flowchart of FIG. 5, it is found that step S701 is added.

If, in step S509, it is determined that the automatic selection function is not enabled, the processing proceeds to step S701. In step S701, the CPU 211 determines whether the job setting value is "cassette 1". Since "cassette 1" is a default value (a value set in the default state) set in step S403, if the job setting value is "cassette 1", it is considered to be relatively highly possible that the user intends to execute a job while merely maintaining the default state. In this case (YES in step S701), the processing proceeds to step S503, in which the CPU 211 allows accepting a job execution instruction.

On the other hand, if it is determined that the job setting value is not "cassette 1" (if it is any one of "cassette 2", "cassette 3", and "cassette 4") (NO in step S701), it is considered to be relatively highly possible that there exists the user's intention to use, for printing, sheets stored in a particular cassette. Thus, the processing proceeds to step S510, in which the CPU 211 inhibits accepting a job execution instruction.

In this way, in the second exemplary embodiment, in a case where the automatic selection function is not enabled, if the cassette specified as the sheet supply source is a cassette specified as the default state, the CPU 211 allows accepting a job execution instruction even when the mentioned cassette has no sheet stored therein. On the other hand, in a case where the automatic selection function is not enabled, if the cassette specified as the sheet supply source is not a cassette specified as the default state, the CPU 211 does not allow accepting a job execution instruction when the mentioned cassette has no sheet stored therein. This can further improve user's convenience.

Furthermore, the number of cassettes included in the printing apparatus 1 is not limited to four as mentioned above, but can be three or less or five or more. Moreover, only some cassettes among the cassettes included in the printing apparatus 1 can be targeted for the implementation of the present invention.

Additionally, although an example has been described in which the acceptance of a job execution instruction is inhibited by lighting off the start button, that acceptance can be inhibited by displaying a warning message in response to the press of the start button while keeping the start button able to be pressed.

Furthermore, aspects of the present invention can also been attained by performing the following processing. For example, the processing includes supplying, to a system or apparatus, a storage medium storing program code (computer executable instructions) of software that implements the functions of the above-described exemplary embodiments, and causing a computer (alternatively, for example, a CPU or a micro processing unit (MPU)) of the system or apparatus to read out the program code stored in the storage medium.

In this case, the program code itself read out from the storage medium implements the functions of the above-described exemplary embodiments, and the program code and the storage medium, which stores the program code, also constitute the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110205 filed May 29, 2015, which is hereby incorporated by reference herein in its entirety.

What is claimed is:

1. A printing apparatus comprising:
    a plurality of sheet storage portions;
    a reading unit configured to read an image on a document to generate image data corresponding to the read image;
    an acquisition unit configured to acquire information about the document the image on which is read by the reading unit;
    a printing unit configured to print an image on a sheet supplied from any one of the plurality of sheet storage portions based on the image data generated by the reading unit;
    a control unit configured to cause, in response to accepting a job execution instruction, which is an instruction to execute a job, the reading unit to perform image reading and the printing unit to perform image printing;
    an automatic selection unit configured to automatically select, from among the plurality of sheet storage portions, a sheet supply source, which is a source for supplying a sheet that is used for printing, based on the information acquired by the acquisition unit; and
    a determination unit configured to determine whether the automatic selection unit is enabled or disabled,
    wherein, in a case where it is determined by the determination unit that the automatic selection unit is enabled, if a user specifies a predetermined sheet storage portion as a sheet storage portion that supplies a sheet for printing from among the plurality of sheet storage portions and the specified sheet storage portion has no sheet stored therein, the control unit does not allow the job execution instruction, wherein, in a case where it is determined by the determination unit that the automatic selection unit is disabled, if a sheet storage portion that supplies a sheet for printing from among the plurality of sheet storage portions has no sheet stored therein, the control unit allows the job execution instruction, and wherein the acquisition unit, the control unit, the automatic selection unit, and the determination unit are implemented by at least one processor.

2. The printing apparatus according to claim 1, wherein, in a case where it is determined by the determination unit that the automatic selection unit is disabled, if a sheet storage portion that supplies a sheet for printing from among the plurality of sheet storage portions has no sheet stored therein, the control unit switches the sheet storage portion having no sheet stored therein to another sheet storage portion serving as a sheet supply source.

3. The printing apparatus according to claim 1, further comprising a storing unit configured to store information indicating a size of a sheet stored in each sheet storage portion in association with respective ones of the plurality of sheet storage portions, wherein the acquisition unit acquires information about a size of the document, and wherein the automatic selection unit selects, from among the plurality of sheet storage portions, a sheet storage portion having stored therein a sheet with a size corresponding to the size of the document based on the information stored in the storing unit and the information acquired by the acquisition unit.

4. The printing apparatus according to claim 1, further comprising a display unit configured to display a setting screen used for performing setting about the sheet supply source, wherein, in a case where the automatic selection unit is enabled, the display unit displays, on the setting screen, an operation key used for specifying use of an automatic selection function of the automatic selection unit, and, in a case where the automatic selection unit is disabled, the display unit does not display the operation key on the setting screen.

5. The printing apparatus according to claim 1, wherein, in a case where the automatic selection unit is disabled, a predetermined sheet storage portion from among the plurality of sheet storage portions is specified as the sheet storage portion that supplies a sheet for printing in a default state.

6. The printing apparatus according to claim 5, wherein, in a case where it is determined by the determination unit that the automatic selection unit is disabled, if a user specifies a sheet storage portion different from the predetermined sheet storage portion, which is specified in the default state, as the sheet storage portion that supplies a sheet for printing and the sheet storage portion specified by the user has no sheet stored therein, the control unit does not allow accepting the job execution instruction.

7. A method for controlling a printing apparatus that includes a plurality of sheet storage portions, a reading unit configured to read an image on a document to generate image data corresponding to the read image, and a printing unit configured to print an image on a sheet supplied from any one of the plurality of sheet storage portions based on the image data generated by the reading unit, the method comprising:

causing, in response to accepting a job execution instruction, which is an instruction to execute a job, the reading unit to perform image reading and the printing unit to perform image printing;

determining, using at least one processor, whether an automatic selection function, which automatically selects, from among the plurality of sheet storage portions, a sheet supply source, which is a source for supplying a sheet that is used for printing, is enabled or disabled;

not allowing the job execution instruction in a case where it is determined that the automatic selection function is enabled, if a user specifies a predetermined sheet storage portion as a sheet storage portion that supplies a sheet for printing from among the plurality of sheet storage portions and the specified sheet storage portion has no sheet stored therein; and allowing the job execution instruction in a case where it is determined that the automatic selection function is disabled, if a sheet storage portion that supplies a sheet for printing from among the plurality of sheet storage portions has no sheet stored therein.

8. The method according to claim 7, further comprising, in a case where it is determined that the automatic selection function is disabled, if a sheet storage portion that supplies a sheet for printing from among the plurality of sheet storage portions has no sheet stored therein, switching the sheet storage portion having no sheet stored therein to another sheet storage portion.

9. The method according to claim 7, wherein the automatic selection function selects, from among the plurality of sheet storage portions, a sheet storage portion having stored therein a sheet with a size corresponding to a size of the document.

10. The method according to claim 7, further comprising:

performing displaying to display, on a setting screen, an operation key used for specifying use of the automatic selection function in a case where the automatic selection function is enabled; and not performing the displaying in a case where the automatic selection function is disabled.

11. The method according to claim 7, wherein, in a case where the automatic selection function is disabled, a predetermined sheet storage portion from among the plurality of sheet storage portions is specified as the sheet storage portion that supplies a sheet for printing in a default state.

12. The method according to claim 11, further comprising, in a case where it is determined that the automatic selection function is disabled, if a user specifies a sheet storage portion different from the predetermined sheet storage portion, which is specified in the default state, as the sheet storage portion that supplies a sheet for printing and the sheet storage portion specified by the user has no sheet stored therein, not allowing accepting the job execution instruction.

13. A non-transitory computer-readable storage medium storing a program to cause a computer to perform a method for controlling a printing apparatus that includes a plurality of sheet storage portions, a reading unit configured to read an image on a document to generate image data corresponding to the read image, and a printing unit configured to print an image on a sheet supplied from any one of the plurality of sheet storage portions based on the image data generated by the reading unit, the method comprising:

causing, in response to accepting a job execution instruction, which is an instruction to execute a job, the reading unit to perform image reading and the printing unit to perform image printing;

determining, using at least one processor, whether an automatic selection function, which automatically selects, from among the plurality of sheet storage portions, a sheet supply source, which is a source for supplying a sheet that is used for printing, is enabled or disabled;

not allowing the job execution instruction in a case where it is determined that the automatic selection function is enabled, if a user specifies a predetermined sheet storage portion as a sheet storage portion that supplies a sheet for printing from among the plurality of sheet storage portions and the specified sheet storage portion has no sheet stored therein; and allowing the job execution instruction in a case where it is determined that the automatic selection function is disabled, if a sheet storage portion that supplies a sheet for printing from among the plurality of sheet storage portions has no sheet stored therein.

14. A printing apparatus comprising:

a plurality of sheet storage portions;

a printing unit configured to print an image on a sheet supplied from any one of the plurality of sheet storage portions based on image data;

a control unit configured to control the printing unit to perform image printing;

an automatic selection unit configured to automatically select, from among the plurality of sheet storage portions, a sheet supply source, which is a source for supplying a sheet that is used for printing; and a determination unit configured to determine whether the automatic selection unit is enabled or disabled, wherein, in a case where it is determined by the determination unit that the automatic selection unit is enabled, if a user specifies a predetermined sheet storage portion as a sheet storage portion that supplies a sheet for printing from among the plurality of sheet storage portions and the specified sheet storage portion has no sheet stored therein, the control unit controls the printing unit not to perform printing, wherein, in a case where it is determined by the determination unit that the automatic selection unit is disabled, if a sheet storage portion that supplies a sheet for printing from among the plurality of sheet storage portions has no sheet stored therein and another sheet storage portion has a sheet that can be supplied, the control unit controls the printing unit to perform printing, and wherein the control unit, the automatic selection unit, and the determination unit are implemented by at least one processor.

15. A method for controlling a printing apparatus that includes a plurality of sheet storage portions and a printing unit configured to print an image on a sheet supplied from any one of the plurality of sheet storage portions based on image data, the method comprising:

controlling the printing unit; and determining, using at least one processor, whether automatically selecting, from among the plurality of sheet storage portions, a sheet supply source, which is a source for supplying a sheet that is used for printing, is enabled or disabled, wherein, in a case where it is determined that automatically selecting is enabled, if a user specifies a predetermined sheet storage portion as a sheet storage portion that supplies a sheet for printing from among the plurality of sheet storage portions and the specified sheet storage portion has no sheet stored therein, controlling includes controlling the printing unit not to perform printing, wherein, in a case where it is determined that automatically selecting is disabled, if a sheet storage portion that supplies a sheet for printing from among the plurality of sheet storage portions has no sheet stored therein and another sheet storage portion has a sheet that can be supplied, controlling includes controlling the printing unit to perform printing.

16. A non-transitory computer-readable storage medium storing a program to cause a computer to perform a method for controlling a printing apparatus that includes a plurality of sheet storage portions and a printing unit configured to print an image on a sheet supplied from any one of the plurality of sheet storage portions based on image data, the method comprising:

controlling the printing unit; and determining, using at least one processor, whether automatically selecting, from among the plurality of sheet storage portions, a sheet supply source, which is a source for supplying a sheet that is used for printing, is enabled or disabled, wherein, in a case where it is determined that automatically selecting is enabled, if a user specifies a predetermined sheet storage portion as a sheet storage portion that supplies a sheet for printing from among the plurality of sheet storage portions and the specified sheet storage portion has no sheet stored therein, controlling includes controlling the printing unit not to perform printing, wherein, in a case where it is determined that automatically selecting is disabled, if a sheet storage portion that supplies a sheet for printing from among the plurality of sheet storage portions has no sheet stored therein and another sheet storage portion has a sheet that can be supplied, controlling includes controlling the printing unit to perform printing.

* * * * *